April 29, 1930.　　　H. F. MAYNES　　　1,756,832
AMUSEMENT RIDE
Filed Sept. 20, 1928　　11 Sheets-Sheet 1
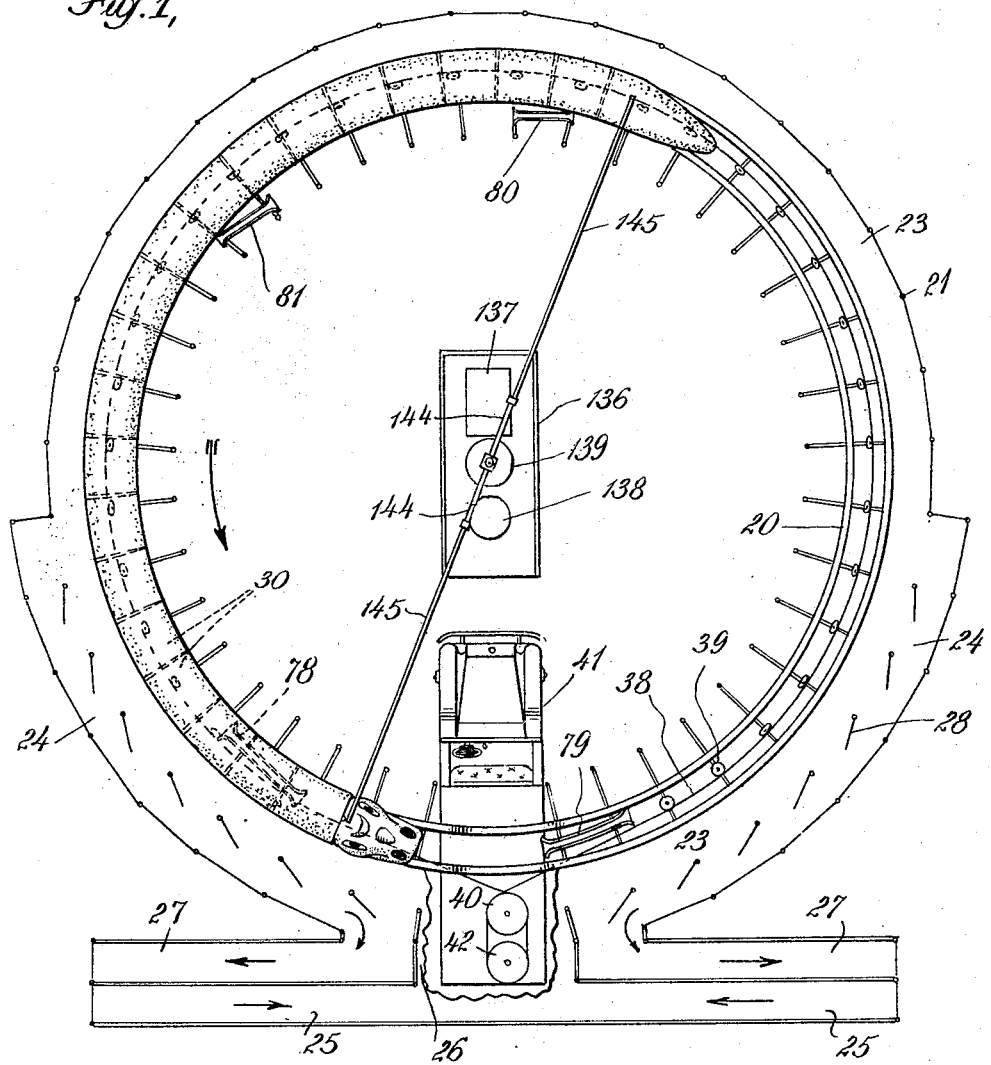
Fig.1,
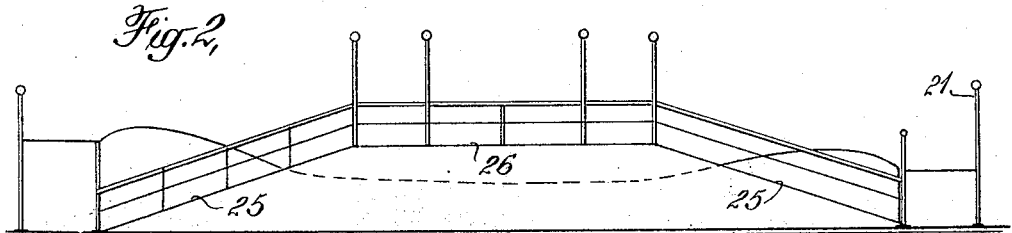
Fig.2,
INVENTOR
Hyla F. Maynes
BY Pennie, Davis, Marvin & Edmonds
his ATTORNEYS April 29, 1930.  H. F. MAYNES  1,756,832
AMUSEMENT RIDE
Filed Sept. 20, 1928    11 Sheets-Sheet 2
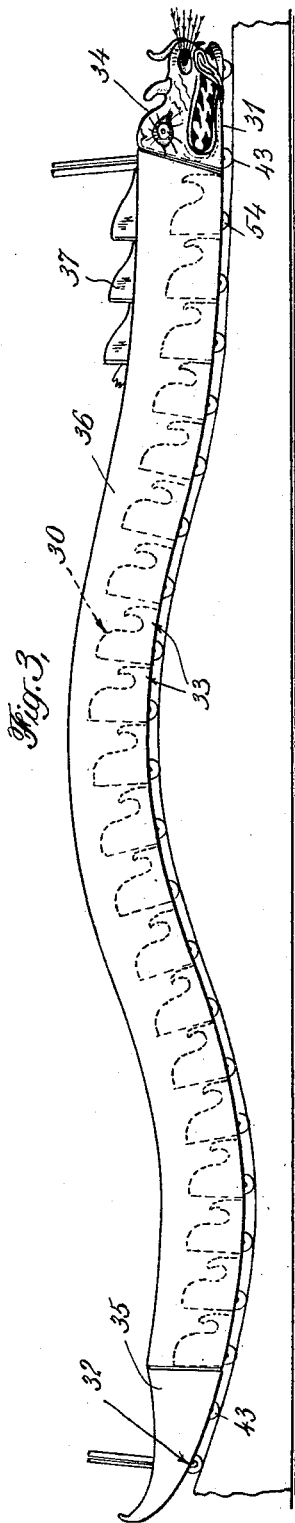
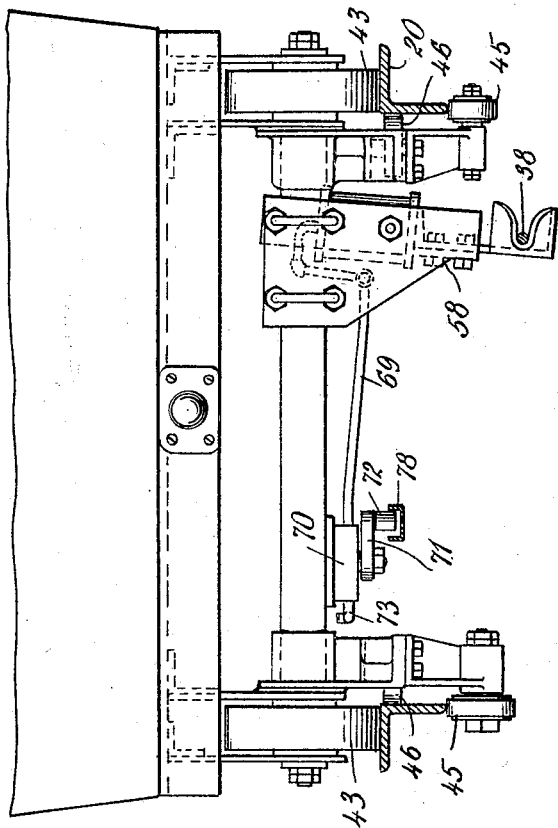
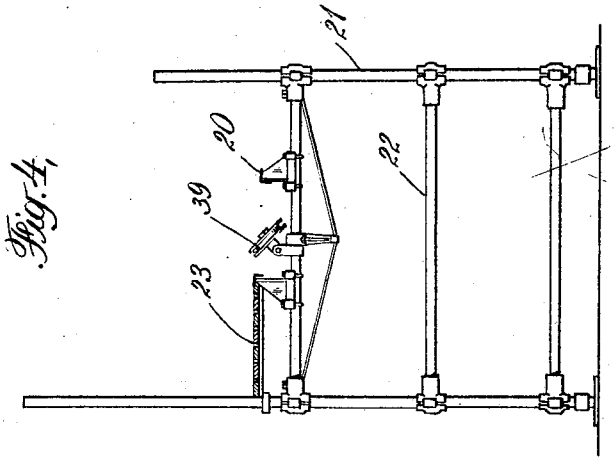
INVENTOR
Hyla F. Maynes
BY
his ATTORNEYS April 29, 1930.  H. F. MAYNES  1,756,832
AMUSEMENT RIDE
Filed Sept. 20, 1928    11 Sheets-Sheet 3
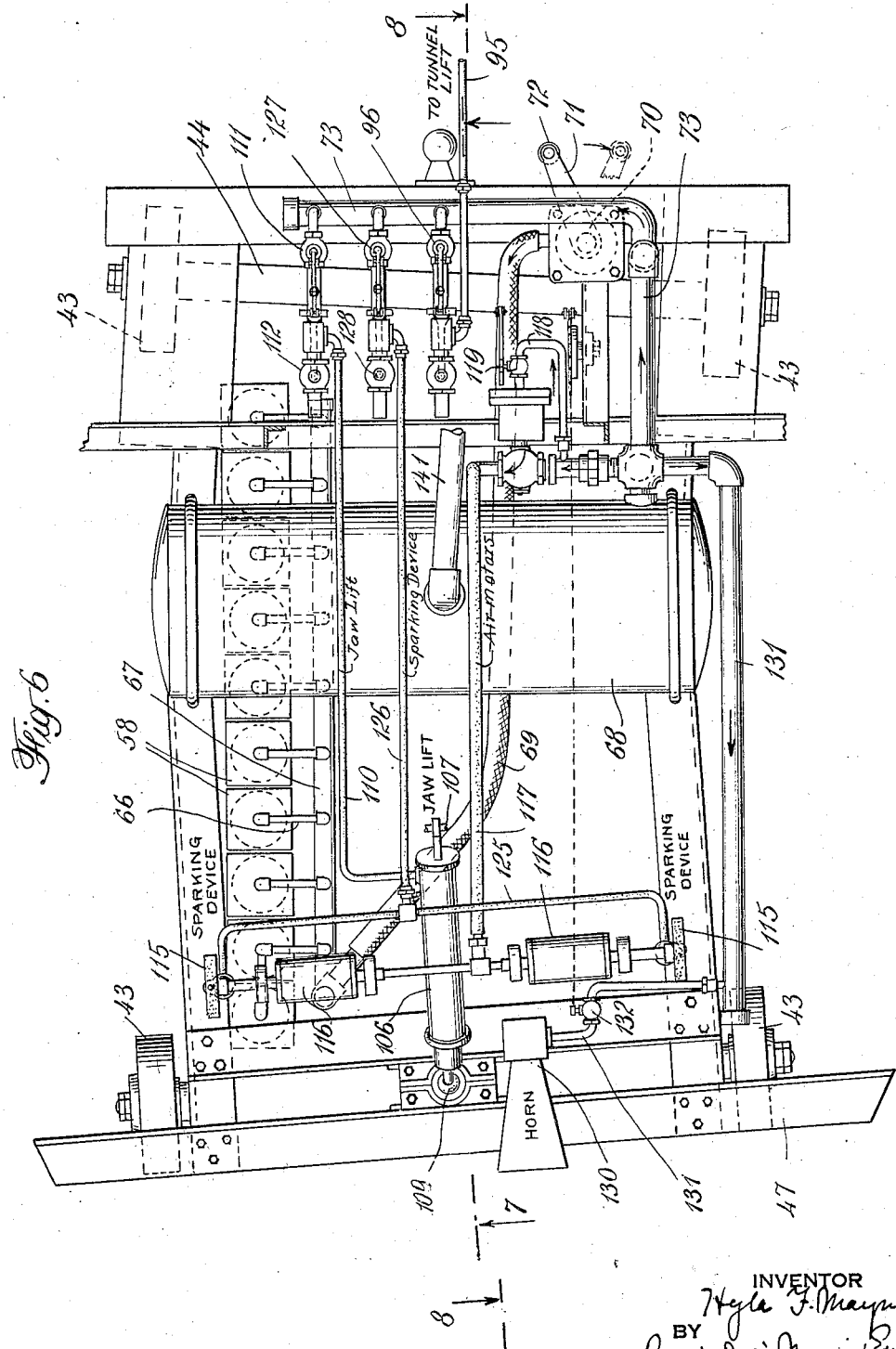

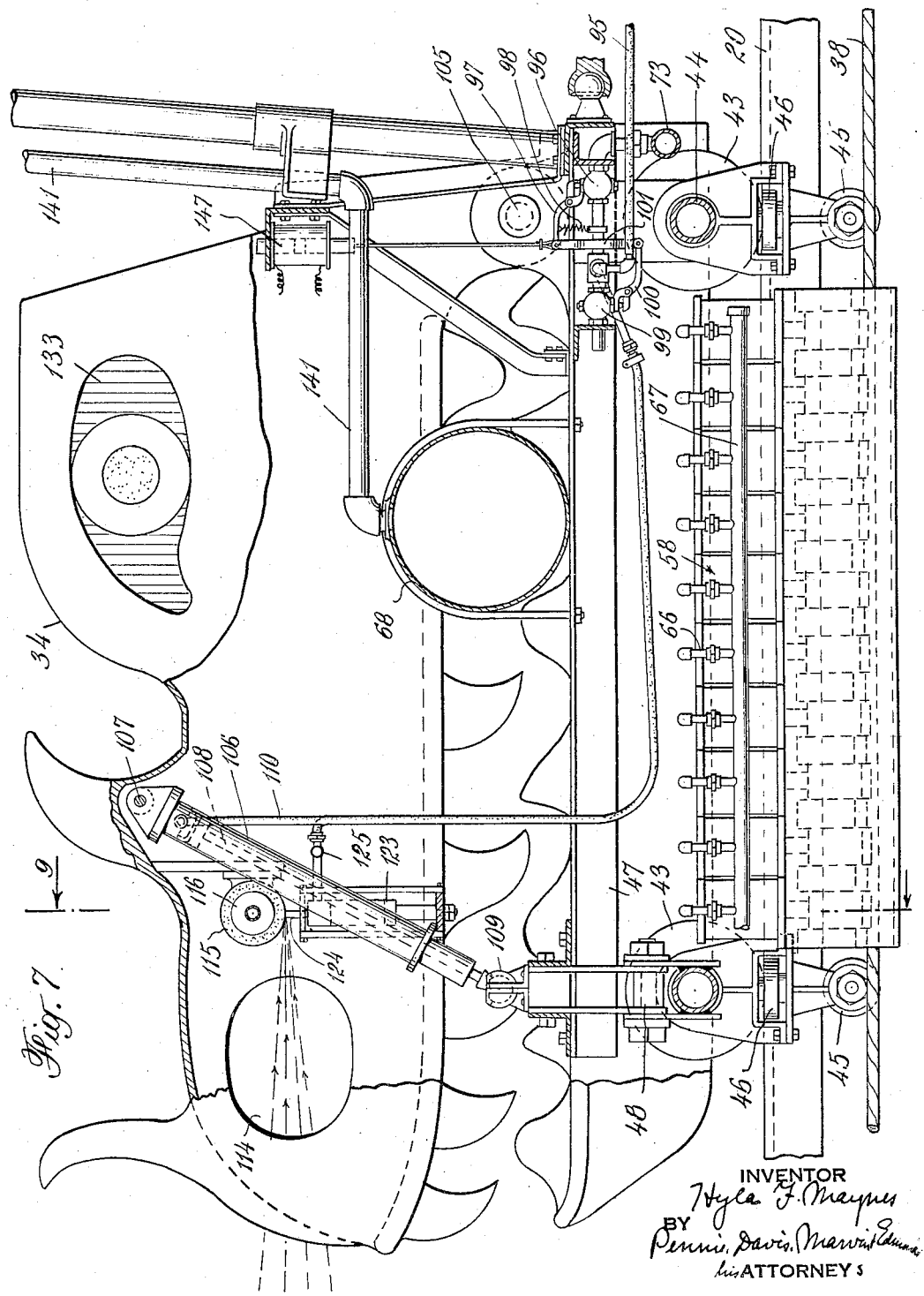

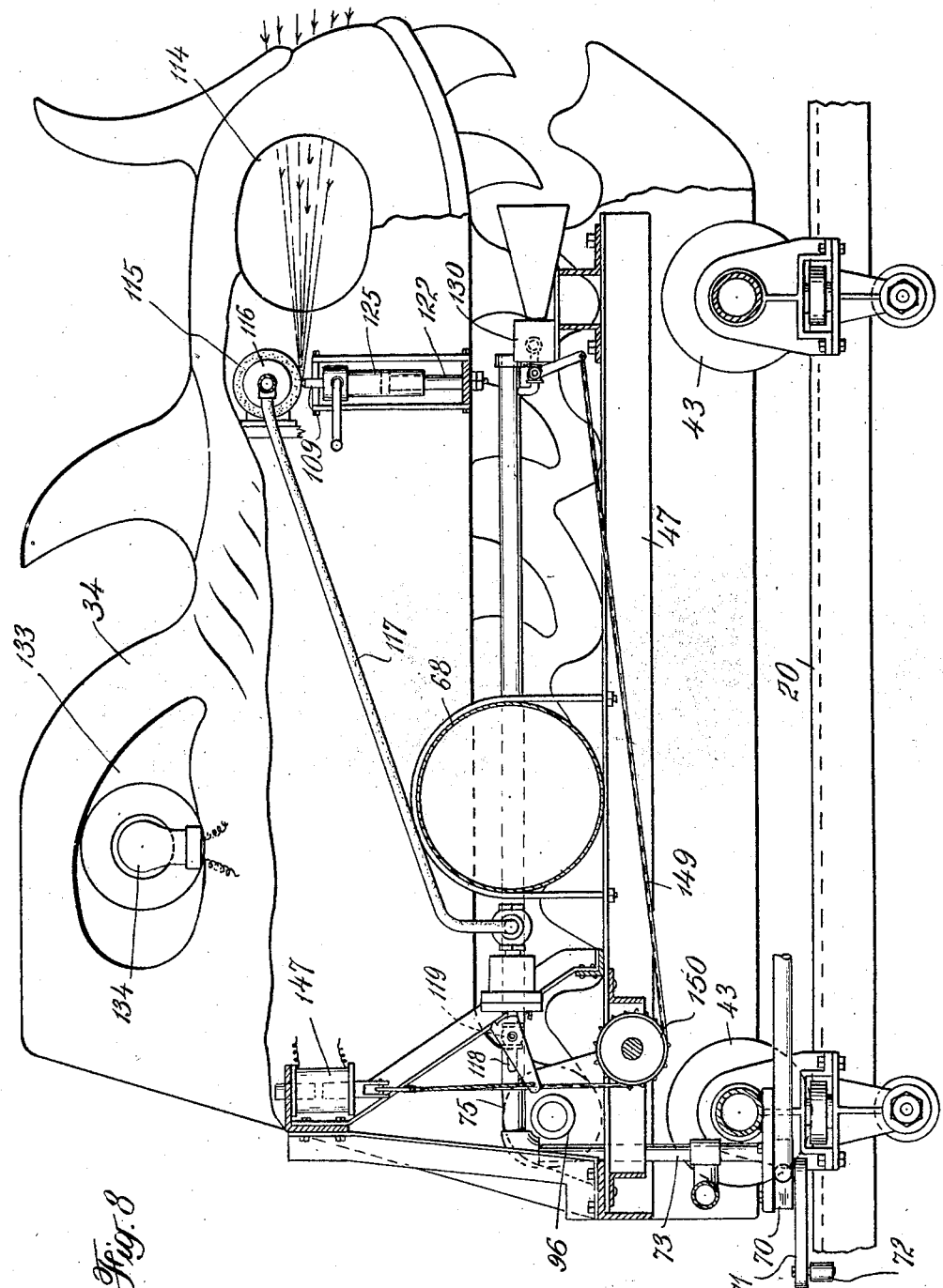

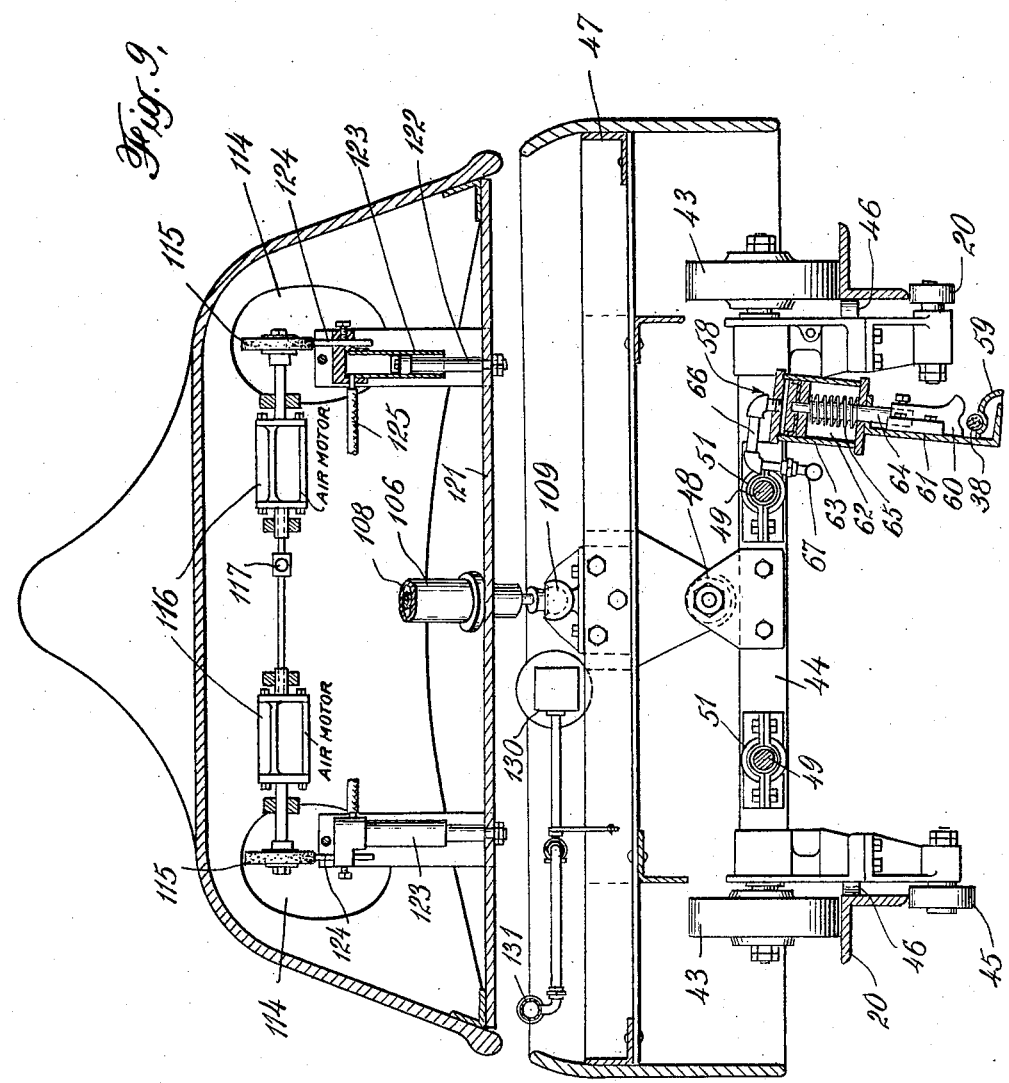

April 29, 1930.  H. F. MAYNES  1,756,832
AMUSEMENT RIDE
Filed Sept. 20, 1928    11 Sheets-Sheet 7
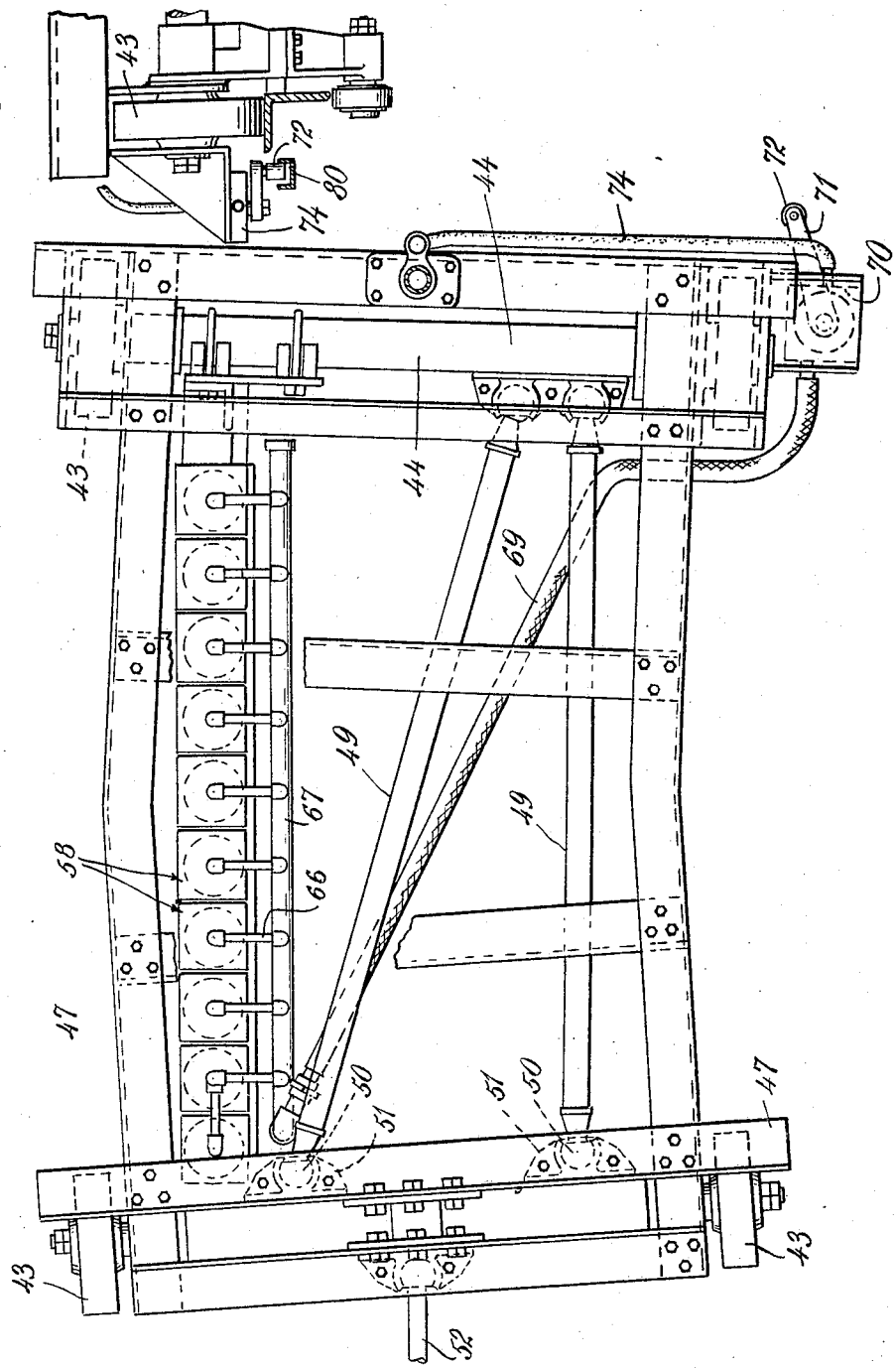

April 29, 1930.  H. F. MAYNES  1,756,832
AMUSEMENT RIDE
Filed Sept. 20, 1928  11 Sheets-Sheet 8
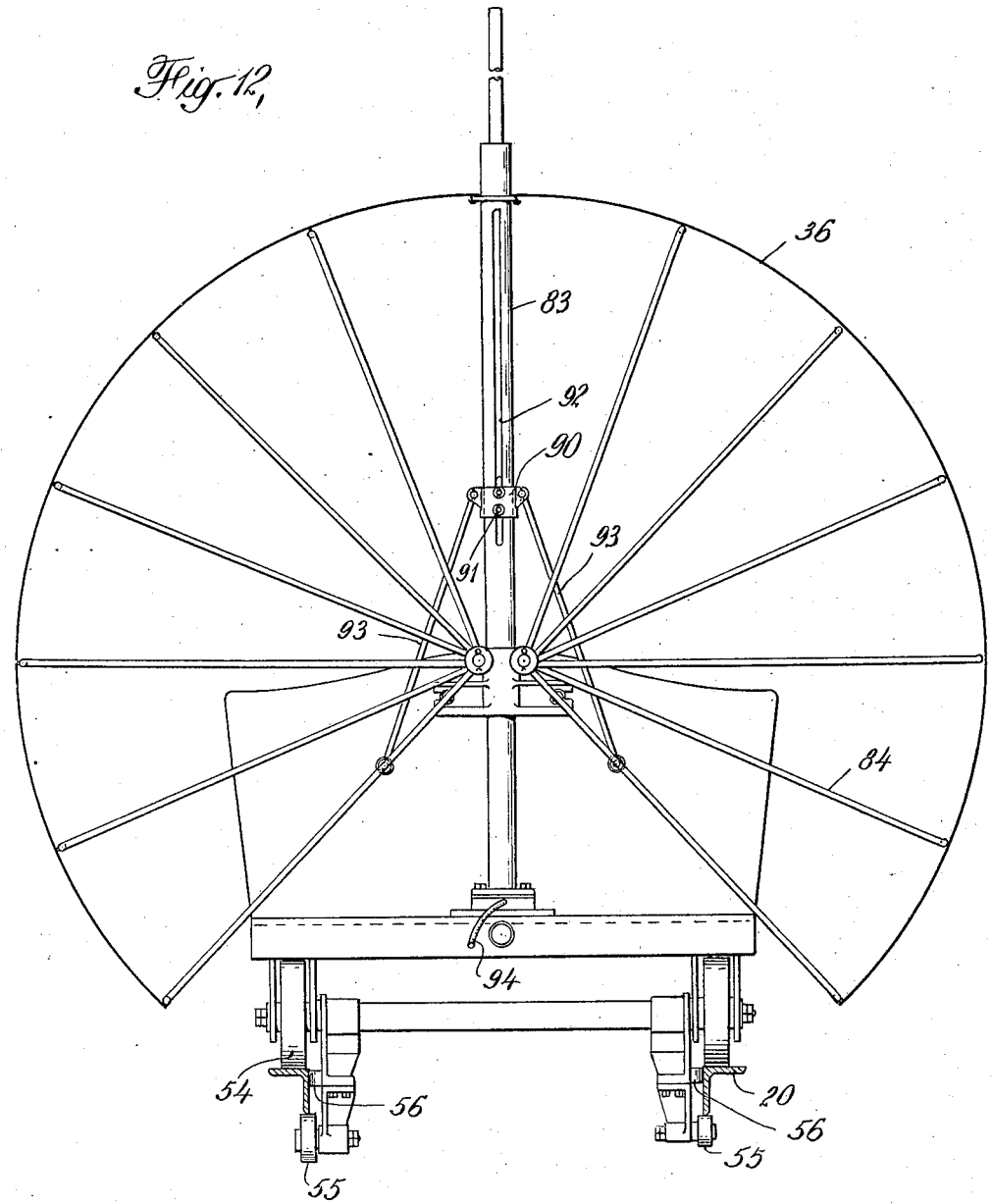

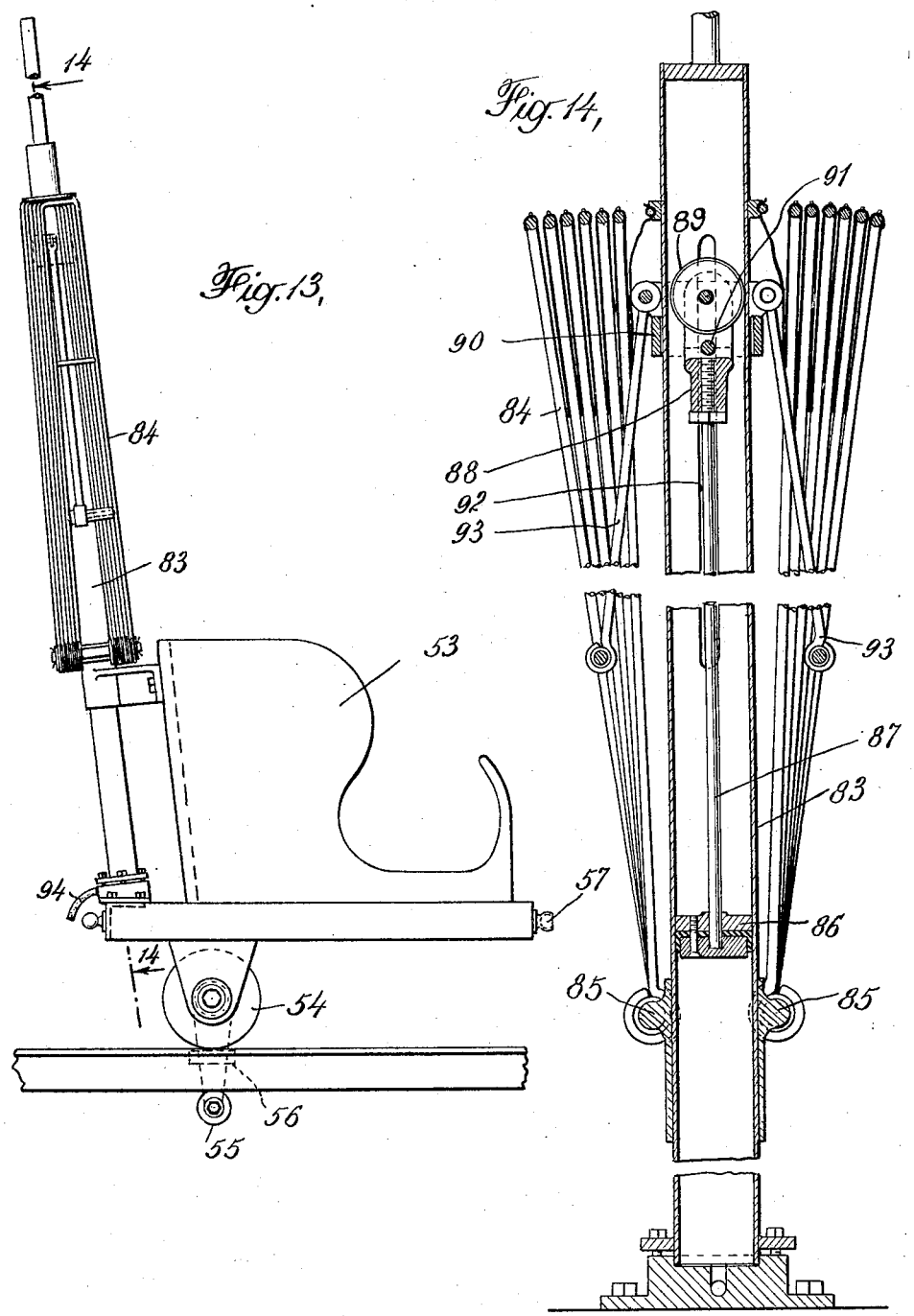

April 29, 1930. H. F. MAYNES 1,756,832
AMUSEMENT RIDE
Filed Sept. 20, 1928 11 Sheets-Sheet 10
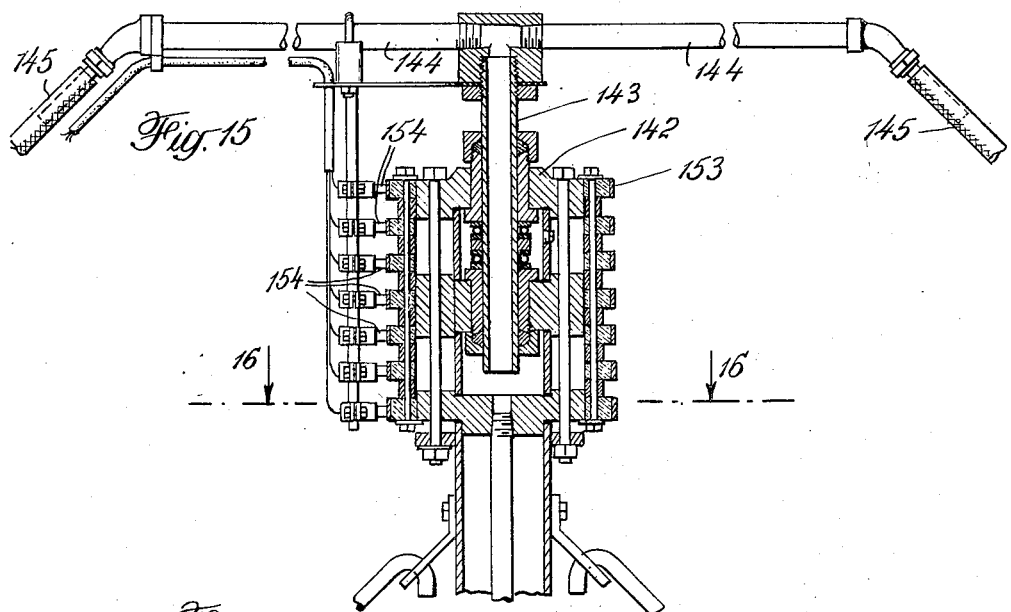
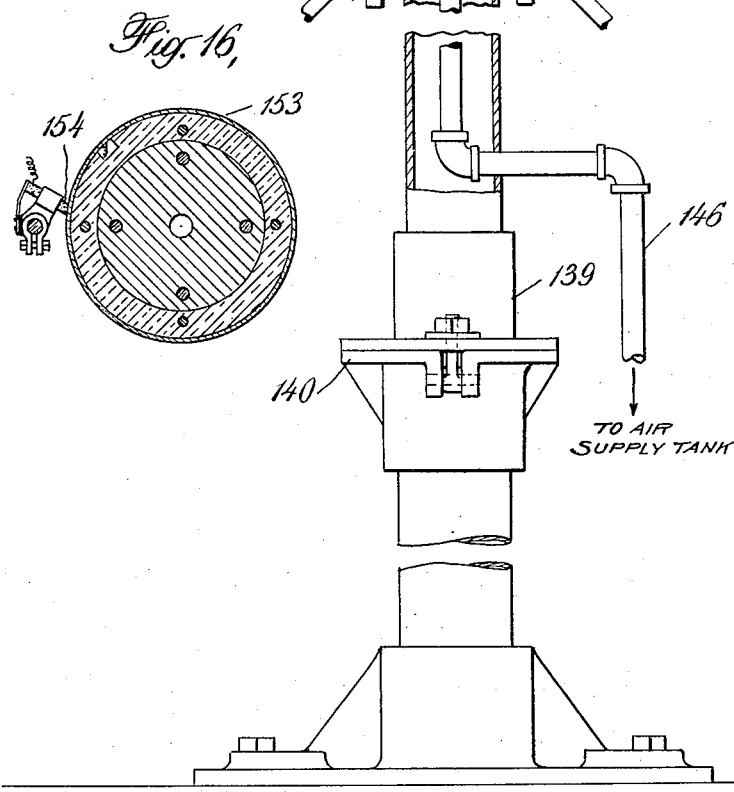

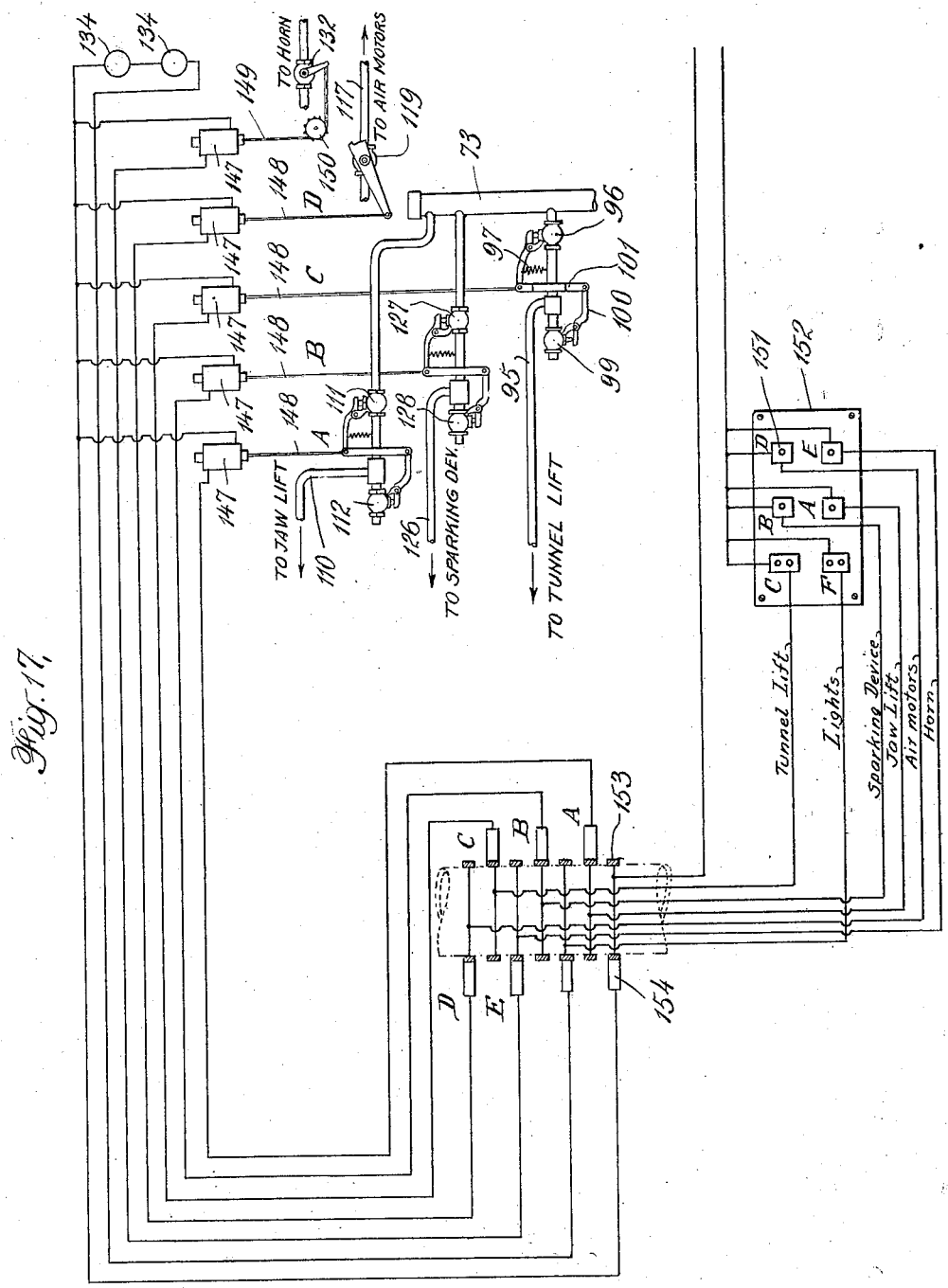

Patented Apr. 29, 1930

1,756,832

UNITED STATES PATENT OFFICE

HYLA F. MAYNES, OF NORTH TONAWANDA, NEW YORK, ASSIGNOR OF ONE-HALF TO EMMA C. MAYNES, OF NORTH TONAWANDA, NEW YORK

AMUSEMENT RIDE

Application filed September 20, 1928. Serial No. 307,249.

This invention relates to amusement rides and has for its object the creation of a ride of arresting novelty, and the provision of new and improved means for operating it.

The ride comprises an undulating endless track around which a train of cars runs. This train is built to simulate a fiery dragon. The head car carries the dragon's head, the tail car the dragon's tail, while the intermediate passenger-carrying cars are provided with a folding, painted canopy which can entirely enclose them and convert the train into a perfect dragon pursuing its sinuous course around and around and up and down the track. The dragon's head has bright eyes, a raucous voice, a mouth which opens and closes, and nostrils which breathe fire. It is altogether a terrifying spectacle. But not too terrifying. Just terrifying enough to make a ride in the bowels of such a monster an experience to be desired and remembered.

The length of the train is less than that of the track. It does not completely encircle the track and the dragon's tail is not in its mouth. The simplest method for driving such a ride would be by means of electric motors carried by the cars. This method, however, is not so simple when the ride is portable, part of a traveling show playing the county and state fairs and encountering all kinds of electricity. I therefore run my ride by means of a cable. Where the ride is in the form of a large wheel with radial sweeps rotating about a central pivot, as the ride illustrated and described in my Patent Reissue No. 16,569, the cable is supported within open guide blocks mounted on the sweeps and exerts its driving pull through friction alone. Where, however, the train extends only part way around the track, as in the present ride, it is necessary that means on the train be provided for positively gripping the cable. According to the present invention I have provided a novel clutch, pneumatically operated, the compressed air being supplied to the moving train from an air compressor situated at the center of the ride through radial tubes which revolve with the train.

Where the cable is supported in open guide blocks and drives through friction it is possible to lead it from the guide blocks to the driving sheave and back. But where the cable is positively gripped this is not possible unless means are provided for releasing the clutches as the cable leaves the train to pass around the driving sheave, and for again closing the clutches after the cable has returned. I have therefore provided automatic means for effecting this releasing and closing of the clutches.

The clutches are operated by compressed air. I also use compressed air to operate the horn, the sparking devices, the jaw lift and the canopy or tunnel lift, all of these being under the control of the operator and made to function at his will.

I have also provided a new type of loading and unloading platform. Around the front half of the track circle adjacent the track I build a loading platform and beyond and continuous with it an unloading platform, the two being separated by sectional railings spaced apart and leading outward. Passengers leaving the train tend to follow the railings and are then naturally led to the outer platform. The inner platform communicates with an entrance ramp and the outer platform with an exit ramp. With this arrangement of platforms the passengers leaving the ride do not interfere with passengers entering it, and it is therefore possible to load and unload with little loss of time, which, in the show business, so often means money.

In constructing this ride I have made numerous improvements in ride construction and operation which I shall point out in connection with the description of the preferred embodiment of my invention illustrated in the accompanying drawings, in which Figure 1 is a plan view of the ride;

Figure 2 is a front elevation of the ride;

Figure 3 is a development of a section of the ride showing the train lying over one of the hills of the ride;

Figure 4 is a detail transverse section through a section of the ride, showing the track support and loading platform;

Figure 5 is an elevation of the rear truck of the head car;

Figure 6 is a plan view of the head car with the dragon head itself removed;

Figure 7 is a vertical longitudinal section through the head car taken along line 7—7 of Figure 6, but showing the dragon's head;

Figure 8 is another vertical longitudinal section through the head car taken along line 8—8 of Figure 6;

Figure 9 is a vertical transverse section through the head car taken along line 9—9 of Figure 7.

Figure 10 is a plan view of the tail car with the dragon's tail removed;

Figure 11 is a detail of the clutch-operating valve mechanism of the tail car;

Figure 12 is a rear view of one of the passenger-carrying cars showing the canopy, or trunnel, in its car-enclosing position;

Figure 13 is a side view of one of the passenger-cars showing the canopy in raised position;

Figure 14 is a vertical section on an enlarged scale taken along line 14—14 of Figure 13 showing in detail the canopy-operating mechanism;

Figure 15 is a vertical section through the center pole through which compressed air is distributed to the various parts of the train;

Figure 16 is a horizontal section taken along line 16—16 of Figure 15 and showing one of the collector rings and brushes by means of which current is supplied to control the various devices mounted in the head of the dragon, and Figure 17 is a wiring diagram illustrating the electrical control.

I shall first describe generally the track, the loading platform, the train and the driving cable, with special reference to Figures 1, 2, 3 and 4.

The ride illustrated comprises a circular undulating track 20, carried by a supporting structure comprising vertical jack stands 21, horizontal members 22 and braces, not illustrated.

Completely surrounding this track and following its undulations is a platform 23. For the rear half of the track this platform 23 is relatively narrow; for the front half it is of double width as illustrated at 24. At the front of the ride are a pair of oppositely disposed loading, or entrance, ramps 25 leading to a central loading platform 26, and thence to the platform 23. Paralleling these loading ramps are a pair of unloading, or exit, ramps 27 receiving passengers from the outer platform 24. Between the inner platform 23 and outer platform 24, are a series of outwardly extending sectional railings 28 which tend to guide persons leaving the ride from inner platform 23 to outer platform 24, and thence down one or the other of ramps 27.

Mounted upon the track 20 is a train of cars 30, this train comprising a head car 31, a tail car 32 and intermediate passenger-carrying cars 33. The head car carries the head 34 of the dragon, the tail car the tail 35, and the intermediate passenger-carrying cars are provided with a collapsible canopy 36 which constitutes the body of the dragon and is appropriately painted. Extending from the head to the tail, and along the tops of the passenger cars are a series of dorsal fins 37 which, when the canopy 36 is in its lowered position, complete the beast.

The train is driven by means of a cable 38 which encircles the track and is supported and guided by means of grooved rollers 39 each tipped to the proper angle to take the thrust of the cable in substantially the plane of the roller. Due to the undulations of the ride the rollers are, of necessity, set at different angles, as clearly illustrated in Figure 1. All the rollers are, however, placed within the circle defined by the cable in order that clutches carried by the train may pick up the cable and pass by the rollers. The cable is driven by means of a driving sheave 40 situated below the loading platform and adjacent a flat section of the track. It is mounted on the rear of a truck 41, and receives power from the truck motor through a special drive shaft. The cable after passing about the driving sheave 40 also passes about an idler sheave 42 before returning to the guide rollers 39.

I shall now describe the cars which comprise the train, with special reference to Figures 5, 6, 7, 8, 9 and 10.

Both the head and tail cars are supported upon two pairs of wheels 43, the axles 44 of which are disposed radially of the ride, as illustrated most clearly in Figures 6 and 10. In order to prevent the cars from leaving the rails, rollers 45 are situated below the vertical flange of the rails, and to take up side thrust, vertical rollers 46 are provided. The frame 47 of each car is rigidly mounted upon the rear axle, as illustrated in Figures 5 and 7, but at its forward end is mounted on the front axle by means of a centrally located hinge joint 48, thereby giving a three-point suspension to the truck and relieving strains on the frame which would result should a rigidly built car pass over the curved undulating track of the ride. The front axle is held in relation to the rear axle by means of a pair of struts or braces 49, one of which is substantially parallel to the inner angle of the frame, while the other extends diagonally across the car. These braces are provided at each end with balls 50 which are seated in receiving sockets 51, carried upon the axles 44. This construction, also, although insuring strength, imparts a necessary flexibility to the structure and permits the cars to yield in passing over the undulations of the track without suffering what would otherwise be a severe strain.

Both head and tail cars are of substantially the same construction and both carry a battery of cable clutches, the operation of which will be described later. In addition, the head car carries the head 34 of the dragon and mechanism for raising and lowering the upper jaw of that head, as well as a horn to furnish a voice for the dragon, sparking devices for breathing fire through its nostrils, lights for furnishing the gleam for its eyes, and the various devices for operating these things, all of which will be described later on. The head car also carries the control means for the canopy lift mechanism. The tail car is much simpler, and in addition to its battery of clutches carries merely the dragon's tail 35. It is connected to the last passenger car of the train by means of a reach rod 52 which is equal in length to one passenger car and gives the correct space for the canvas from the last car to the first tail carrying arch on the tail car.

The passenger-carrying cars comprise the usual body 53 mounted upon a pair of rear wheels 54 each provided, as in the case of the head and tail car wheels, with under-rollers 55 and side thrust rollers 56. The front end of each car is supported by means of a ball and socket joint from the rear end of the preceding car. Each passenger car carries at its rear a canopy support with its folding ribs, which will be described later.

I shall now describe the clutch by means of which the pull of the cable is transmitted to the train, with particular reference to Figures 1, 5, 6, 8, 9 and 10.

Supported from and beneath the axles of both the head and tail cars, and near the outer wheels, is a battery of clutches 58. There are ten clutches in each battery and two batteries on the train. Each clutch comprises a fixed lower jaw 59 and a vertically movable upper jaw 60 slidable in guideways 61. Mounted above the upper jaw 60 is a cylinder 62 in which slides a piston 63, the piston rod 64 of which is secured at its lower end to the movable jaw 60. A compression coil spring 65, which surrounds the upper end of the piston rod 64 and bears against the lower face of the piston and the upper face of the lower cylinder head, urges the jaw 60 upward into cable-releasing position. The upper end of the cylinder 62 communicates, by means of a pipe 66, with a compressed air manifold 67, which may be placed in communication with a source of compressed air. As long as the manifold 67 is not in communication with the source of compressed air, the spring 65 holds the clutch jaws apart. But as soon as air under pressure enters the manifold 67, and from it passes through the pipe 66, to cylinder 62, the piston 63 is moved downward moving the upper jaw 60 toward the fixed jaw 59 to grip the cable should it lie between them.

The description so far is applicable to the clutches carried by either the head or the tail car. There is really no difference between the clutch systems of the two cars, but the head car, because of its other pneumatically operated devices, carries a storage tank reservoir 68 from which air is fed to manifold 67, through hose 69, whereas, in the case of the tail car which carries no storage tank, compressed air is fed to the manifold 67 from hose 69 directly from the primary source of supply. Both batteries, also, are automatically controlled by identical valves which I shall now describe.

The control valve 70 for the head car clutches is mounted at the rear of the truck between the wheels, and is provided with a horizontally swinging arm 71 from the outer end of which depends a cam roller 72. Air from the storage tank 68 passes to the valve 70 through pipe 73. When valve 70 is closed no air can pass from pipe 73 to hose 69, and the hose 69 is open to the atmosphere through an exhaust port in the valve. When, however, the arm 71 is swung to open the valve, passage of air, through hose 69 and thence to manifold 67 and the clutches, is permitted, and the exhaust is closed. The tail car is also provided with a valve 70 having a control arm 71 constructed and functioning exactly like the same valve on the head car. The tail car valve, however, is mounted beyond the wheels of the truck on the inside of the track, as illustrated most clearly in Figures 10 and 11. For reasons which will become apparent the two valves should not be in alignment. Air is fed to valve 70 on the tail car through hose 74, and from the valve through hose 69 to the clutches.

I shall now describe the manner in which these valves are operated to control the action of the clutches, with particular reference to Figures 1, 5 and 11.

Situated between the rails of the track adjacent to and in advance of the driving sheave 40, is a cam channel 78 lying diagonally of the track and leading outward. This cam channel is provided with flaring ends, and is designed to receive the roller 72 of the swinging arm 71 of the valve 70 carried by the head car. A similar cam channel 79 is mounted between the rails of the track just beyond the driving sheave. This channel is also placed diagonally of the track, but leads inward and is also designed to receive the roller 72. On the opposite side of the track are situated two other and similar cam channels 80 and 81, both lying within the circle of the inner rail and designed to receive the cam roller 72 of the arm 71 which controls the valve 70 on the tail car. These cam channels 80 and 81 are also placed at an angle relative to the track, channel 80 extending away from the track in the direction of movement of the train and channel 81 toward the track.

As the head car approaches the cam channel 78, valve 70 is open and in consequence the clutches on that car are gripping the cable. As the car passes over this channel, however, the arm 71 of the valve 70 is swung outward, this movement closing the valve 70 and permitting the air within the cylinders 62 of the clutches to exhaust; whereupon the springs 65 raise the upper clutch jaws and release the cable. Thus, as the head car passes the driving sheave the clutches are open and the cable is free to leave the guide rollers 39 and pass about the driving sheave. Simultaneously with this releasing action of the head car clutches, the clutches on the tail car are closed by means of the action of cam channel 80, so that although the head car clutches have been released, the train still grips the cable and is being positively driven. As the head car passes over cam channel 79 the valve 70 is automatically re-opened to permit compressed air again to pass to the clutches and move them into cable-griping position. At the same time cam channel 81 opens valve 70 on the tail car and releases the tail car clutches. Thus, the train is driven by the head car clutches for the entire circuit of the ride, with the exception of the distance between the cam channels 78 and 79, during which period the tail car clutches are in operation.

I shall now describe the tunnel or canopy which closes the passenger-carrying cars, and the mechanism for raising and lowering it, with particular reference to Figures 12, 13 and 14.

Mounted on the rear of each passenger car 33 is a cylindrical post 83 which carries the canopy lift mechanism. The canopy 36 is carried directly by these posts 83 and also by a series of folding ribs 84 pivotally mounted at 85, one set on each side of each post 83. Between the cars the canopy is supported by means of coil springs, not illustrated, extending between the outer ends of corresponding ribs 84 on adjacent cars, and also between adjacent posts 83. These springs expand and contract as the ride passes over the undulations and thus support the canopy effectively, no matter what the position of the ride. In Figure 12 the ribs are shown in their open, or spread, position with the canopy completely covering the cars, while in Figure 13 and 14 the ribs are shown in their closed position with the canopy raised above the cars.

Within the cylindrical post 83 is mounted a piston 86 from which extends a piston rod 87 terminating at its upper end in a yoke 88 which carries a roller 89 and a collar 90, designed to slide on the outer face of the post 83. The yoke 88 is connected to the collar 90 by means of a pin 91 which extends through vertical slots 92 in the post. A pair of lift rods 93 are pivotally connected at their lower ends to the outer rib 84 and at their upper ends to the collar 90. Thus, as the collar 90 moves up the post 83 the canopy ribs 84 are swung upward into closed position, as illustrated in Figure 14, and when the collar 90 moves down along the post the ribs are opened fan-wise to their spread position, as illustrated in Figure 12. Upward movement of the collar 90 is effected by means of compressed air entering at 94 into the bottom of the cylindrical post 83 and forcing piston 86 upward, and downward movement is effected by opening the lower end of cylinder 83 to the atmosphere. The connection 94 receives its air from a main line 95 extending along the train which in turn receievs its air from a horizontal extension of the pipe 73 on the head car which acts as an air manifold for a number of valves.

Passage of air from the manifold 73 to the air line 95 is controlled by means of a valve 96 (see Figures 7 and 17) having an operating arm 97 normally urged downward into valve closing position by means of a spring 98. Beyond the valve 96 is an exhaust valve 99 having an operating arm 100 connected by means of a link 101 with the operating arm 97 of the valve 96. The two valves are so arranged that when one is open the other is closed and thus when arm 97 is raised to open valve 96 and permit air to pass from manifold 73 to air line 95, the arm 100 of valve 99 is moved to close that valve; and when spring 98 is permitted to close valve 96, valve 99 is automatically opened and air in line 95 permitted to exhaust into the atmosphere.

I shall now describe the jaw lift, the sparking devices, the horn and the eye lights and the various mechanisms mounted within the head for operating these things, referring particularly to Figures 6, 7, 8 and 9.

The lower jaw of the dragon's head is so arranged as to be an integral part of the truck frame of the head car. The upper jaw is hinged near the back of the mouth and near the rear of the frame at 105. The forward part of the upper jaw is supported by a cylinder 106 pivotally mounted at 107 to the top of the head, and a piston and piston rod 108 pivotally mounted on the forward end of the truck frame by means of a ball and socket joint 109. The upper jaw can be swung upward by admitting air into the cylinder 106 above the piston 108 through a hose 110. This hose 110 receives air from manifold 73 and is provided with a control valve 111 and an exhaust valve 112 which are constructed to operate precisely like valves 96 and 99 which control the canopy lift. The jaws are therefore closed by closing valve 111 which simultaneously opens valve 112 and permits the weight of the upper jaw to force the air from cylinder 106 through pipe 110, through exhaust valve 112 and to the atmosphere.

In the extreme forward part of the upper jaw just behind the nostrils 114, are mounted a pair of small grinding wheels 115, one behind each nostril. Each of these grinding wheels is rotated by means of an air motor 116 to which air is supplied by means of a pipe 117. Pipe 117 receives its air from tank 68 through pipe 118 controlled by valve 119. Mounted just below each of these grinding wheels on a transverse supporting plate 121, is a piston 122 carrying a movable cylinder 123 on the upper end of which is adjustably mounted a rod 124 of iron or steel or other pyrophoric metal. The iron rod 124 is moved upward and into contact with the grinding wheel by means of air introduced into the cylinder 123 through manifold 125, this manifold receiving air from pipe 126. When these iron rods are moved into contact with the rotating grinding wheels, a shower of sparks is directed outward through each nostril. Pipe 126 receives air from manifold 73 through valve 127 which is constructed and operates precisely as valves 96 and 111. An exhaust valve 128 communicates with pipe 126 so that when valve 127 is closed the weight of the cylinders 123 forces air out through open valve 128 and the iron rods are thus moved out of contact with the grinding wheels and sparking ceases.

A pneumatically operated horn 130 is mounted near the forward end of the mouth. Air for operating this horn is received through pipe 131 which is controlled by means of a valve 132.

The eyes 133 are illuminated by means of a pair of electric lights 134 which are flashed off and on at the will of the operator as will be presently described.

Power for driving the cable 38 is furnished by the gasoline engine of the truck 41. All other parts of the ride, however, including the clutch-operating mechanism, the jaw lift, the sparking device, the canopy lift and the horn are pneumatically operated. I shall therefore now describe the manner in which compressed air is furnished to these various parts, with particular reference to Figures 1, 6, 7, 10 and 16.

An uncovered wagon 136, such as is used in outdoor expositions, is located at the center of the ride. An air compressing unit 137 capable of supplying air at a pressure of eighty pounds per square inch is located in the forward part of this wagon and supplies compressed air to a tank 138 located at the rear of the wagon. In the center of the wagon a center pole 139 is mounted and hinged at 140 so that the upper part can be laid horizontal during transportation. The upper end of this pole terminates in an air box 142 in which is journaled a hollow spindle 143 terminating in two horizontal branch pipes 144 to which are connected air hose 145. Air enters the pole 139 through an air pipe 146 leading from the supply tank 138, through the air box 142, and thence through the hollow spindle 143, branch pipes 144 and air hose 145 to the head and tail cars of the train. The air passing to the head car enters the storage tank 68 through pipe 141 and from this tank is fed to the various pneumatically-operated devices previously described. Air passing to the tail car passes directly through hose 74 to the valve 70 which controls the clutches.

The spindle 143 being rotatable within the air box 142, the hose 145 follows the train as it traverses the track. The pole 139 is made high enough to lift the hose 145 above any obstructions within the circle of the ride and permit the cars to be reached easily when on the hills of the undulating trackway.

The valves which govern the admission of air to the canopy lift, the sparking mechanism, the jaw lift, and the horn are electrically controlled. The lights which illumine the eyes are also electrically controlled. I shall therefore now describe the electrical control mechanism which I employ with particular reference to Figures 7, 8, 15, 16 and 17.

Mounted across the rear of the head car and situated above the various control valves are a series of five solenoids 147 connected to valves 111, 127, 96 and 119 by cables 148, and to valve 132 by means of a chain 149 which passes around a sprocket wheel 150. These solenoids are normally de-energized and all of the valves, just described, are in closed position. To operate any of the various devices mounted within the head of the dragon, or to operate the canopy lift mechainsm, the solenoid controlling the valve in question must be energized. This is done by means of switches 151, mounted upon a switchboard 152 located on the platform of the ride and under the control of the operator. There are six of these switches, four single button switches, A, B, D and E, and two regular switches C and F. Six lines run from the switchboard, and one line direct from the main power line to collector rings 153 mounted on the air head 142. Brushes 154 suspended from pipes 144 and rotating with them, contact with these collector rings and carry current to the solenoids and the eye lamps. By closing the appropriate switch, the operator closes the circuit through one of the solenoids which is thus energized and the valve which it controls is opened to admit air to the device in question. Thus, by closing switches D and B the air motors are rotated and the iron rods moved into contact with them to produce the desired shower of sparks. As long as these switches are kept closed the sparks will continue to fly from the dragon's nostrils. As soon, however, as the switches are opened this sparking ceases. Switches C and F are so constructed that they may be closed and left closed without constant attention on the part of the operator. This permits the ride to operate with the canopy closed for some time and permits the dragon's eyes to shine steadfastly.

The operation of the ride may be briefly reviewed as follows:

The train having come to a stop the passengers disembark, stepping onto platform 23 and proceeding naturally between guide railings 28 to outer platform 24 and thence down ramp 27. Meanwhile passengers for the next ride enter along ramps 25 and enter the train from platform 23. Incoming and outgoing passengers therefore do not interfere with each other and loading and unloading is profitably expedited.

The passengers having taken their seats, power is transmitted to the driving sheave, causing the cable to move, and as the clutches on one or the other of the two clutch cars are gripping the cable, the train moves with it. As the head car passes the driving sheave its clutches are automatically released so that the cable is free to pass to the sheave and return again. During this interval the clutches on the tail car are automatically thrown into gripping position so that the train is always positively driven. After the cars have made one or two revolutions with the canopy raised and the passengers in full view of all spectators, the operator closes switch C and lowers the canopy shielding the riders from public gaze. To those outside, the ride then resembles the legendary dragon with startling verisimilitude. To complete the illusion, the operator closes appropriate switches 151, whereupon the jaws of the dragon open and close, sparks fly from its nostrils, a loud and horrible sound emanates from its mouth and its eyes flash. When the end of the ride comes the canopy is again raised so that the passengers can dismount without difficulty. If desired, of course, the operator can raise and lower the canopy a number of times during the ride.

Mechanically the ride represents a marked departure from rides of the same general type previously designed. By using a cable drive I can use an ordinary truck engine as the source of driving power and by means of my automatically controlled pneumatic clutches I can use a cable drive on a ride in which the train is shorter than the track. I also consider the use of pneumatic means for operating the canopy lift and the various novelties in the head an important advance because it greatly simplifies the mechanism necessary to accomplish the desired results.

Emotionally the ride is equally novel. It not only affords real thrills to those carried by it but commands the attention of passersby. The ride itself is its own best ballyhoo.

I claim:

1. An amusement ride comprising the combination of an endless track, a car movable over the track, a cable for pulling the car, a driving sheave for the cable, a pneumatic cable clutch carried by the car, means for supplying air to hold the clutch in cable-gripping position, means for automatically cutting off the supply of air as the car passes the driving sheave to release the clutch, and means for automatically turning it on again after the driving sheave has been passed.

2. An amusement ride comprising the combination of an endless track, a car movable over the track, a cable for pulling the car, a driving sheave for the cable a pneumatic cable clutch carried by the car, means for supplying air to hold the clutch in cable-gripping position, a valve controlling the passage of air to the clutch, a cam along the track in advance of the driving sheave for automatically closing the valve as the train approaches the driving sheave, and a second cam along the track beyond the driving sheave for opening the valve.

3. An amusement ride comprising the combination of a track, a train of cars movable over the track, a cable for pulling the train, a cable clutch carried by a forward car, a cable clutch carried by a rear car, means for releasing the clutch on the forward car and means for simultaneously closing the clutch on the rear car.

4. An amusement ride comprising the combination of a track, a train of cars movable over the track, a cable for pulling the train, a cable clutch carried by a forward car, a cable clutch carried by a rear car, means for operating the two clutches simultaneously, the clutch on the forward car being released as the clutch on the rear car is closed, and vice versa.

5. An amusement ride comprising the combination of an endless track, a train of cars movable over the track and extending only part way around it, a cable for pulling the train, a driving sheave for the cable, a cable clutch carried by a forward car, a cable clutch carried by a rear car, means for automatically releasing the clutch on the forward car as that car passes the driving sheave, means for simultaneously closing the clutch on the rear car, means for closing the clutch on the forward car after it has passed the driving sheave, and means for simultaneously releasing the clutch on the rear car.

6. An amusement ride comprising the combination of a track, a car movable over the track, a cable for pulling the train, a pneumatic cable clutch carried by the car, a source of compressed air for the clutch, means for automatically releasing the clutch when the air is turned off, and means for connecting the source of compressed air with the clutch to cause it to grip the cable.

7. An amusement ride comprising the combination of a circular track, a car movable over the track, a cable for pulling the car, a pneumatic cable clutch carried by the car, a source of compressed air supply situated at the center of the track and an air connection between the car and the source of supply which revolves with the car.

8. An amusement ride comprising the combination of a track, a car or train movable over the track, a platform adjacent the track from which passengers enter and leave the car or train and means situated along the middle of the platform for guiding outgoing passengers to the outer side of the platform.

9. An amusement ride comprising the combination of a track, a car or train movable over the track, a loading platform adjacent the track, an entrance passageway communicating with the loading platform at one end, an unloading platform adjacent the loading platform, an exit passageway communicating with the unloading platform at one end, a series of guide railings situated between the loading and unloading platforms, the space between adjacent guide railings leading gently from the loading to the unloading platform.

10. In an amusement ride having a traveling passenger car or train, the combination with the car or train of a folding canopy traveling therewith and adapted to fold and unfold transversely of the path of movement of the car or train and lying when folded above the car or train.

11. In an amusement ride having a traveling passenger car or train, the combination with the car or train of a folding canopy traveling therewith and adapted to fold and unfold transversely of the path of movement of the car or train, lying when folded above the car or train, and means for folding and unfolding the canopy during the ride, half on one side of the car or train and half on the other.

12. An amusement ride comprising the combination of a circular track, a car or train movable over the track, a canopy carried by the car or train, pneumatic means carried by the car or train for folding the canopy during operation of the ride, a source of compressed air supply situated at the center of the track and an air connection between the car or train and the source of supply, which connection revolves with the train.

13. An amusement ride comprising the combination of a car, an upright post on the car, folding ribs pivotally mounted on either side of the post, a folding canopy carried by the post and the ribs, a piston within the post, linked connections between the piston and the post, and means for raising the piston to close the ribs and fold the canopy.

14. An amusement ride comprising the the combination of a car, an upright post on the car, folding ribs pivotally mounted on either side of the post, a folding canopy carried by the post and the ribs, a piston within the post, linked connections between the piston and the post, means for admitting compressed air to the post below the piston to raise the latter and fold the canopy, and means for reducing the pressure within the post whereby the canopy is unfolded by virtue of its own weight.

15. In an amusement device simulating an animal, the combination of a pair of jaws, a cylinder connected to one of the jaws, a piston in the cylinder, a piston rod connected to the piston and to the other jaw and means for admitting fluid to the cylinder to open the jaws.

16. In an amusement device simulating an animal, the combination of a pair of hinged jaws, a cylinder pivotally connected to one of the jaws, a piston in the cylinder, a piston rod connected to the piston and pivotally connected to the other jaw, means for admitting air under pressure to the cylinder to open the jaw, and means for reducing the pressure in the cylinder whereby the jaws close by gravity.

17. In an amusement device simulating an animal, the combination of an abrasive wheel, a pyrophoric metal, means for rotating the abrasive wheel and means for moving the pyrophoric metal, into contact with the rotating wheel whereby a shower of sparks issues from the animal.

18. In an amusement device simulating an animal, the combination of an abrasive wheel, a cylinder mounted below the wheel, a piston in the cylinder, a pyrophoric metal carried by the cylinder, means for rotating the wheel, means for introducing air under pressure into the cylinder to move the metal into contact with the rotating wheel whereby a shower of sparks issues from the animal, and means for reducing the pressure in the cylinder so that the weight of the cylinder and metal break contact with wheel and cease sparking.

19. In an amusement device simulating an animal having nostrils, the combination of a grinding wheel behind each nostril, means for rotating the wheels, an iron rod mounted below each wheel and pneumatic means for moving the iron rod into contact with the rotating grinding wheels whereby a stream of sparks is caused to issue from each nostril.

20. An amusement ride train comprising a head car, passenger-carrying cars, an animal's head carried by the head car, a folding canopy carried by the passenger cars and resembling the animal's body, and means for folding and unfolding the canopy.

21. An amusement ride comprising the combination of a train of cars, an animal's head carried by the head car, a folding canopy carried by the other cars, pneumatically operated devices carried in the head, pneumatically operated means for folding the canopy and a common source of compressed air for all the pneumatically operated devices.

22. An amusement ride comprising the combination of a circular track, a train of cars movable over the track, a pneumatically operated device carried by the train, a source of compressed air situated at the center of the track, and means revolvable with the ride for supplying compressed air to the pneumatic device during the operation of the ride.

23. An amusement ride comprising a train of cars, an animal's head carried by the head car, means for opening and closing the animal's jaws, means for causing sparks to fly from its nostrils, and means for giving it a voice.

24. An amusement ride comprising a car or train, a pneumatically operated device carried by the car or train, a source of compressed air, a conduit for leading compressed air to the pneumatically operated device, a control valve in the conduit, an exhaust valve adjacent the control valve, means for simultaneously operating the valves whereby when the control valve is opened the exhaust valve is closed, and vice versa.

25. An amusement ride comprising a car or train, a pneumatically operated device carried by the car or train, a source of compressed air, a conduit for leading compressed air to the pneumatically operated device, a control valve in the conduit and electrically operated means for opening the control valve.

26. An amusement ride comprising the combination of a car or train, pneumatically operated devices carried by the car or train, a source of compressed air, conduits for leading compressed air to the pneumatically operated devices, a solenoid mounted adjacent each control valve, a source of electrical energy, a normally open circuit including each solenoid and the source of electrical energy, and switches external of the train for selectively closing any circuit, thereby energizing its solenoid and opening a control valve.

27. An amusement ride comprising the combination of a circular track, a car or train movable over the track, a pneumatically operated device carried by the car or train, a source of compressed air, a center pole, a rotatable member on the pole, a stationary conduit in this pole leading compressed air from the source of supply to the rotatable member, a conduit leading the air from the rotatable member to the train, a valve for controlling the passage of air from the conduit to the electrically operated device, electrical means for operating the control valve, a source of electrical energy, collector rings on the center post, wires extending from the source of electrical energy to the collector rings, brushes carried by the rotatable member and contacting with the collector rings, wires extending from the brushes to the electric control means, and a switch external of the cars for completing the circuit to operate this electrical control means, open the air control valve and hence operate the pneumatic device.

28. An amusement ride comprising the combination of a track, a train of cars having a head car and passenger cars movable over the track, a cable for pulling the train, a pneumatic cable clutch carried by the train, an animal's head carried by the head car of the train, pneumatic means for opening the jaws, means for causing sparks to issue from the nostrils, pneumatic means for operating the sparking means, a folding canopy for enclosing the passenger cars, pneumatic means for folding the canopy, a common source of compressed air for all pneumatic devices and valves controlling the passage of air from the source of supply to each device.

29. In an amusement ride, the combination of an endless undulating track, a car movable over the track, a cable for pulling the car following the track, and grooved rollers for supporting the cable, the grooved rollers being disposed at such an angle as to carry the thrust of the cable.

30. In an amusement ride, the combination of an endless undulating track, a car movable over the track, a cable for pulling the car following the track, grooved rollers for supporting the cable all placed within the enclosure defined by the cable, and a cable clutch carried by the car.

In testimony whereof I affix my signature.
HYLA F. MAYNES.